Apr. 3, 1923.

H. G. FRENCH.
PROTECTIVE DEVICE.
FILED JULY 26, 1917.

1,450,415.

Inventor:
Henry G. French,
by Albert G. Davis
His Attorney.

Patented Apr. 3, 1923.

1,450,415

UNITED STATES PATENT OFFICE.

HENRY G. FRENCH, OF SCHENECTADY, NEW YORK, ASSIGNOR TO GENERAL ELECTRIC COMPANY, A CORPORATION OF NEW YORK.

PROTECTIVE DEVICE.

Application filed July 26, 1917. Serial No. 183,006.

*To all whom it may concern:*

Be it known that I, HENRY G. FRENCH, a citizen of the United States, residing at Schenectady, county of Schenectady, State of New York, have invented certain new and useful Improvements in Protective Devices, of which the following is a specification.

My invention relates to polyphase systems of distribution and particularly to means responsive to conditions of unbalanced load on such systems and an object of my invention is to provide a device responsive to a predetermined load unbalancing, whether such unbalancing is due to an open phase or other abnormal conditions, and more particularly an object of my invention is to provide a device arranged to operate protective apparatus for protecting polyphase electric motors under unbalanced load conditions.

Various devices are known in the art for opening a polyphase circuit upon the occurrence of abnormal conditions and for preventing polyphase motors from operating under single phase conditions, but such devices are complicated, not always positive in their action and are not operative under all conditions that may occur. I have provided, however, an improved type of protective device which is simple, compact and positive in its action, which is automatically operative to control an electric switch and cause it to open when a conductor of any phase is opened or is disconnected or when a condition of unbalancing occurs above a predetermined amount between the conductors of any of the phases and which is not operative when overloads up to several times normal, occur in all the phases.

The novel features which I believe to be characteristic of my invention will be definitely indicated in the claims appended hereto, while the features of construction and mode of operation will be understood by reference to the following description taken in connection with the accompanying drawing which shows the preferred embodiments of my invention and in which:—

Figure 2:
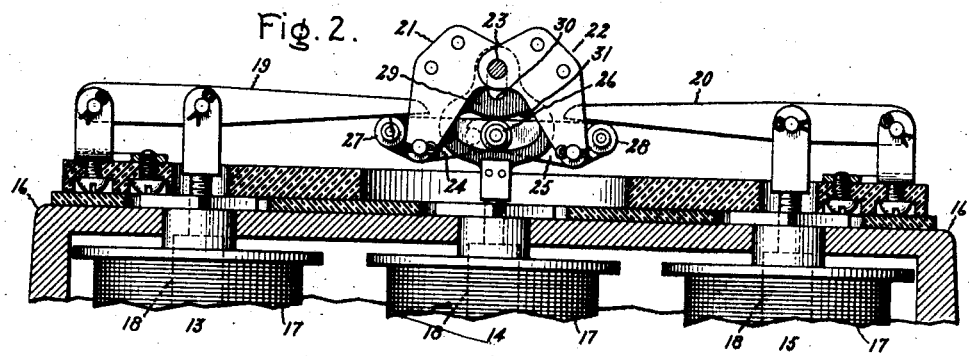
Figure 3:
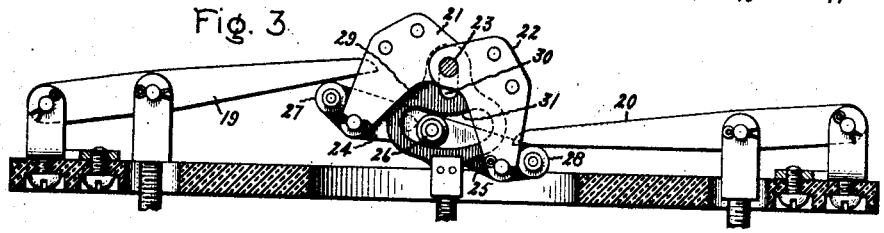
Figure 4:
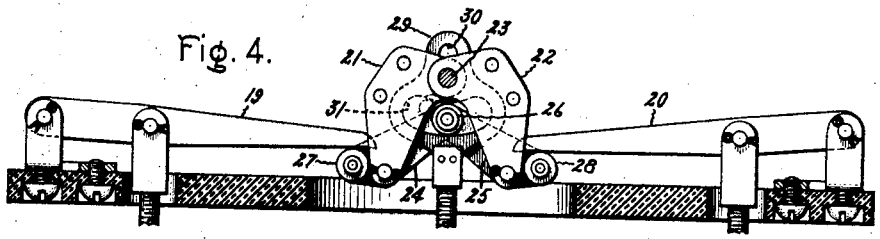
Figure 1:
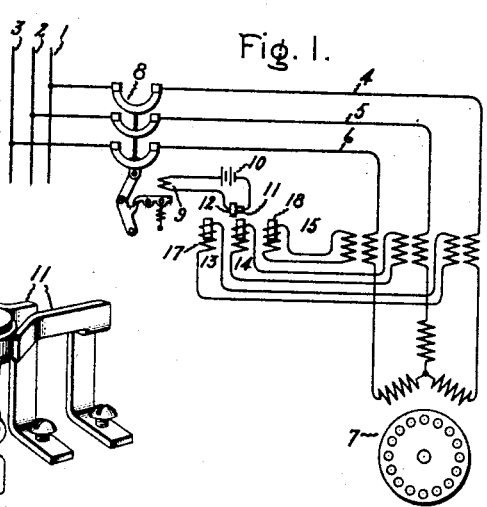
Figure 5:
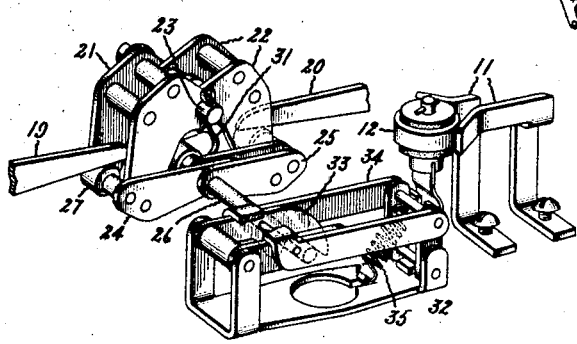

Fig. 1 shows diagrammatically a polyphase system of distribution including a polyphase motor protected by a device embodying the principles of my invention; Figs. 2, 3 and 4 are side elevations, partly in section, of a portion of my protective device; and Fig. 5 is a perspective view of the tripping mechanism for the device.

In Fig. 1, I have shown a polyphase system of distribution comprising conductors 1, 2 and 3 which supply energy through conductors 4, 5 and 6, respectively, to a polyphase motor 7. Controlling the circuit of the motor, is a switch 8 which is adapted to be automatically operated to open the polyphase circuit or to cut the motor 7 out of circuit. For holding the switch 8 in circuit closing position, I provide a holding means or coil 9 which is included in a normally closed circuit including a source of energy 10. The circuit is controlled by co-operating contact members 11 and 12, operated by my relay device as will be presently described.

For controlling the circuit of the holding coil 9, I provide my improved type of protective or relay device which, for the protection of a three phase circuit, comprises three electroresponsive elements or solenoids 13, 14 and 15, one corresponding to each phase of the circuit, mounted in alignment and suitably inclosed in a protective structure or casing 16. Each electroresponsive device comprises an actuating or energizing winding 17 and a cooperating movable plunger or armature 18, the energizing windings 17 for the solenoids 13, 14 and 15 being connected through transformers to the conductors 4, 5 and 6, respectively. The plungers 18 extend through openings in the top of the casing 16 and are associated with and operatively related to actuating members mounted on top of the casing which cooperate, as best shown in Fig. 2, to maintain the plungers 18 in mechanical balance when the pull or force exerted on the plungers 18 by their respective windings 17 are substantially equal.

To obtain this mechanical balance, I provide lever arms or actuating members 19 and 20 oppositely disposed and pivoted at one end to a support carried on the top of casing 16 and pivotally connected at a point intermediate their ends, to the plungers 18 of solenoids 13 and 15, respectively. Between the free ends of lever arms 19 and 20 is located a balancing mechanism comprising movable or hinged members 21 and 22 secured at one end to a suitably supported common hinge or bearing member 23 and having a toggle or collapsible connection comprising links 24 and 25 connected between their free ends, the links 24 and 25 being connected by a common shaft or bearing pin 26 which extends beyond the links 24 and 25 to form a tripping member. The links 24 and 25 are provided with shoulder portions, carrying roller supports 27 and 28, respectively, which engage and restrain the free ends of lever arms 19 and 20, respectively. The balancing mechanism consisting of hinged members 21 and 22 and toggle 24—25 is movable as a unit or is adapted to be rocked, as a unit about the bearing member 23 either to the left or right in response to the movement of either actuating members 19 or 20.

Cooperating with the balancing mechanism, is the actuating member 29 which is connected to the plunger 18 of solenoid 14 and longitudinally movable thereby. This longitudinally movable member 29 is provided with two slots or openings 30 and 31, the bearing member 23 extending through the longitudinally disposed slot 30 and movable therein while the bearing pin 26 extends through and is movable in the arcual slot 31. These slots are so related and have a configuration such that as long as the winding 17 for solenoid 14 is energized equally with the windings for solenoids 13 or 15, the actuating member 29 is held in a position to maintain bearing member 23 at the upper end of slot 30 and bearing pin 26 in a central position in slot 31 to prevent the collapse of the toggle or collapsible connection 24—25 and render the balancing mechanism movable as a unit. The slot 31 being of an arcual configuration, permits the balancing mechanism to rock in either direction as a unit.

Carried by the balancing mechanism and movable therewith is the tripping member 26 which also serves as a bearing pin for toggle 24—25, the tripping member cooperating, as best shown in Fig. 5, with a tripping or circuit controlling means 32 for the circuit of holding coil 9. This circuit controlling means comprises the fixed and cooperating movable contact members 11 and 12, respectively, which are held in circuit closing position by a collapsible toggle having links 33 and 34 biased by means of a spring 35 to circuit opening position. The tripping member 26 is movable in response to movement of the balancing mechanism to engage the tail portion of toggle link 33 to collapse the toggle 33—34 and permit the contact members 11 and 12 to separate.

The operation of my relay device may be described as follows. Under normal conditions when the electroresponsive devices or solenoids 13, 14 and 15 are exerting a substantially equal force, that is, when the windings 17 thereof are pulling down on their respective plungers 18 by substantially equal amounts, the actuating members 19 and 20 tend to move downwardly about their pivots. The free ends of members 19 and 20 thereby exert equal forces on the shoulders of the toggle links 24—25 tending to collapse the same, but this action is prevented by the actuating member 29 which is acted on by its solenoid 14 to hold the bearing member 23 in the top of its slot 30 and the member 26 in a central position in its slot 31. The balancing mechanism thereby holds actuating members 19 and 20 in equilibrium and the three actuating members 19, 20 and 29 are, therefore, all held in mechanical balance as shown in Fig. 2. This balanced relation is accordingly unaffected when heavy overloads occur in all the phases, due for instance to heavy currents caused by starting up the motor 7.

Assume now that due to an unbalanced condition between the phases above a predetermined amount or due to an open circuit occurring on one conductor, for instance, conductor 4, the winding 17 of the corresponding solenoid 13 exerts a lesser force on its plunger 18, then the mechanical balance between the actuating members 19, 20, and 29 is disturbed and the lever arm 19 corresponding to solenoid 13 is unable to balance the pull of arm 20 and consequently arm 20 overcomes arm 19 and rocks the balancing mechanism including hinged members 21 and 22 and toggle links 24 and 25 as a unit about their bearing member 23, into the position shown in Fig. 3. The toggle 24—25 is prevented from collapsing by the force exerted on actuating member 29 by its solenoid 14. During this movement of the balancing mechanism to the left, the tripping member 26 rides to the left through its slot 31 into tripping position and releases the toggle 33—34 of the circuit controlling mechanism 32 to open the circuit of the holding coil 9 which thereby opens the switch 8. In a similar manner, the balancing mechanism is rockable as a unit to the right in response to an unbalancing permitting actuating member 19 to overcome member 20 and likewise the tripping member 26 moves in its slot 31 in the opposite direction to tripping position.

Should electroresponsive device 14 have a weaker pull due to unbalancing or to an open circuit in conductor 5, the pull exerted on lever arms 19 and 20 by their solenoids 13 and 15 respectively overcomes the actuating member 29 and moves it upward, at the same time collapsing toggle 24—25 and permitting the hinged members 21 and 22 to move toward each other into the position shown in Fig. 4. The collapse of toggle 24—25 raises the tripping member 26 into tripping position and again releases the toggle 33—34 of the circuit closing mechanism 12 to open the switch 8. If, however, the electroresponsive device 14 should exert a force greater than the forces exerted by each of the electroresponsive devices 13 and 15 and the forces exerted by devices 13 and 15 be equal, the protective device would fail to operate and the tripping member 26 would not be actuated. Under all other conditions of load unbalance, however, the device will cause the tripping member 26 to be actuated.

When the forces exerted by the electroresponsive means 13, 14 and 15 are again substantially equal, due to the return of normal conditions, the actuating members assume, automatically, their balanced condition but the toggle 33—34 of the circuit closing means must be moved to restrained or circuit closing position by hand.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with an electric switch and a polyphase circuit controlled thereby, of a device for controlling said switch comprising independent elements responsive to load conditions in each phase, and means for holding said elements in equilibrium under balanced load conditions but operative to permit one or more of said elements automatically to open said switch on a condition of unbalance arising between any two of said phases beyond a predetermined amount.

2. The combination with an electric switch and a polyphase circuit controlled thereby, of a device for controlling said switch comprising independent elements respectively responsive to conditions in each phase, and means for holding said elements inoperative in response to conditions of overload similarly affecting all the phases but for rendering said elements operative in response to either the opening of any phase or a condition of current unbalancing between any two phases above a predetermined amount for automatically opening said switch.

3. The combination with a polyphase electric motor and a switch controlling said motor, of a relay for controlling the opening of said switch, comprising independent cooperating electroresponsive elements having windings respectively connected in different phases of the motor circuit, and means for holding said elements inoperative by the excessive current caused by starting said motor but operative when any phase is opened, or when the load unbalancing between two phases exceeds a predetermined amount.

4. The combination with an electric switch and a polyphase circuit controlled thereby, of a control circuit for said switch, circuit controlling means for said control circuit, a tripping member for controlling said circuit controlling means, separate electroresponsive elements respectively responsive to conditions in the phases of said circuit, and means controlled by said elements for causing said member to move to tripping position in response to either a condition of open phase or an unbalanced load condition on said circuit.

5. A relay device comprising a plurality of independently movable actuating members, electroresponsive means for moving said members, an independent balancing mechanism for holding said members in a balanced relation as long as the forces exerted by said electroresponsive means are substantially equal, and a tripping member movable by said mechanism into tripping position when said balanced relation is disturbed.

6. A relay device comprising a plurality of electroresponsive devices, independently movable actuating members controlled thereby, means carried by one of said members for holding all said actuating members in balanced relation when the forces exerted by said electroresponsive devices are substantially equal and movable by any of said members when the forces exerted by said electroresponsive devices are unequal, and a tripping member actuated by the movement of said means.

7. A relay device comprising a plurality of electroresponsive devices, a longitudinally movable actuating member controlled by one of said devices, pivotally mounted actuating memers controlled by other of said devices, and means carried by said longitudinally movable member for holding said pivotally mounted and longitudinally movable members in balanced relation, and a tripping member actuated by said means when the balanced relation of said members is disturbed.

8. In combination with a plurality of conductors, independently movable actuating members, electroresponsive means connected to each conductor for moving said actuating members, and separate means for holding said actuating members in balanced relation as long as the forces exerted by said electroresponsive means are substantially equal, said means comprising hinged members and a collapsible connection between said hinged members, said hinged members and collapsible connection being movable as a unit under certain unbalanced conditions, and said connection being collapsed under other unbalanced conditions.

9. A relay device comprising two independently movable lever arms, electroresponsive means for moving said arms, hinged members movable about a common pivot and cooperating with said arms to maintain them in balanced relation when the forces exerted by said electroresponsive means are substantially equal, a collapsible connection between said hinged members for holding said members in balancing position, and an electroresponsively actuated member for controlling the collapse of said connection.

10. A relay device comprising a longitudinally movable member, cooperating pivoted members oppositely disposed relatively to said longitudinally movable member, electroresponsive means controlling said members, and a collapsible mechanism between said pivoted members for holding said members in balanced relation when the forces exerted thereon by said electroresponsive means are substantially equal, said mechanism being rockable as a unit about a common pivot in response to unequal forces exerted on said pivoted members and collapsible when the force exerted on said longitudinally movable member is less than the forces exerted on said pivoted members.

11. The combination with an electric switch for a polyphase circuit, of a device comprising windings respectively responsive to the current in each phase, independently movable members operatively related to each winding, and means associated with said members acting to hold said members inoperative as long as the currents affecting all the phases are substantially equal but operative in response to a condition of either open phase or unbalancing between any two phases for automatically opening said switch.

12. The combination with a polyphase system of distribution, of an apparatus comprising a plurality of electroresponsive devices, each having a winding in circuit relation with one phase of the system, each winding being connected to a different phase, and means mechanically interconnecting the electroresponsive devices whereby the apparatus is held in normal position when substantially the same current flows in each conductor of the system and is moved from normal position when the current in one conductor differs from the current in another conductor by a predetermined amount.

13. The combination with a polyphase circuit, of a device comprising a plurality of independent movable elements respectively responsive to the conditions in different phases of said circuit, and means for holding said elements inoperative in response to conditions of overload similarly affecting all the phases arranged to render said elements operative in response either to the opening of any phase or current unbalancing above a predetermined amount between two phases.

In witness whereof, I have hereunto set my hand this 23rd day of July, 1917.

HENRY G. FRENCH.